V. C. CHACE.
HIGH SPEED ATTACHMENT FOR MILLING MACHINES AND THE LIKE.
APPLICATION FILED AUG. 11, 1906.
916,269.
Patented Mar. 23, 1909.
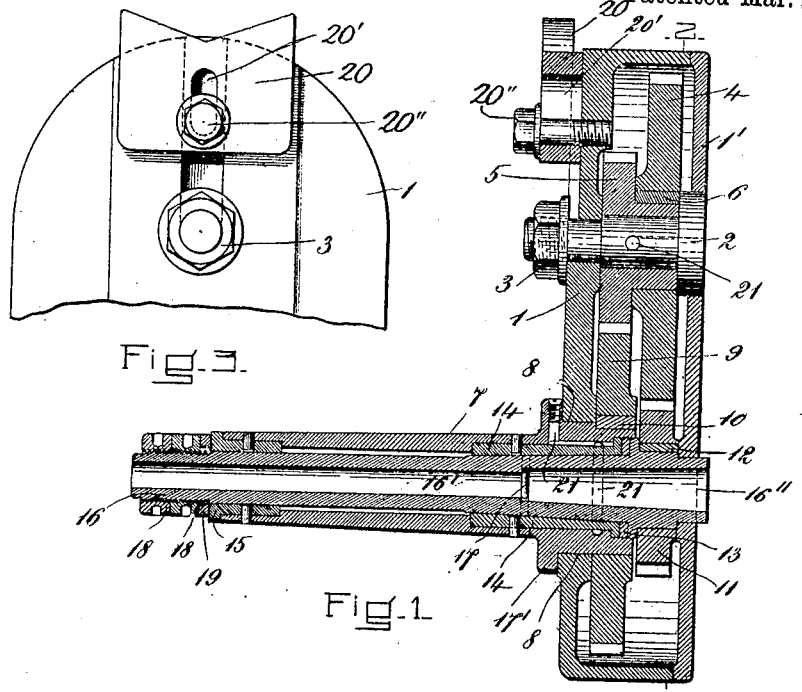
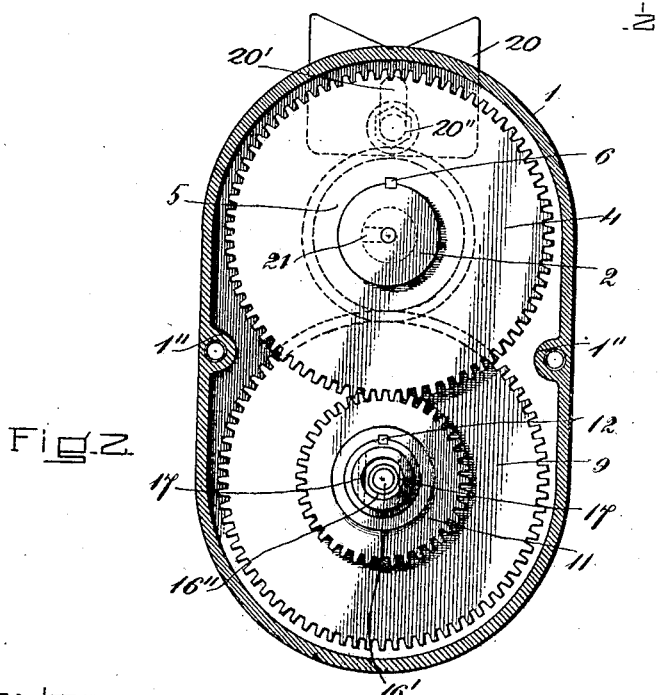
WITNESSES:
INVENTOR:
Victor C. Chace
by Browne & Woodworth
atty's.

UNITED STATES PATENT OFFICE.

VICTOR C. CHACE, OF NEW BEDFORD, MASSACHUSETTS, ASSIGNOR TO MORSE TWIST DRILL & MACHINE CO., A CORPORATION OF MASSACHUSETTS.

HIGH-SPEED ATTACHMENT FOR MILLING-MACHINES AND THE LIKE.

No. 916,269.     Specification of Letters Patent.     Patented March 23, 1909.

Application filed August 11, 1906. Serial No. 330,118.

*To all whom it may concern:*

Be it known that I, VICTOR C. CHACE, a citizen of the United States, and a resident of New Bedford, in the county of Bristol and State of Massachusetts, have invented a new and useful Improvement in High-Speed Attachments for Milling-Machines and the Like, of which the following is a specification.

My invention relates to attachments for milling machines and the like, and its object is to provide a simple and compact portable apparatus which may quickly be applied to milling or other machines to receive the smaller sizes of milling cutters, drills, taps, etc., and give the same higher rates of speed than the spindle of such machine.

One embodiment of my invention is shown in the drawings which accompany and form a part of this specification, and in which,—

Figure 1 shows a longitudinal section of my high speed attachment for milling or other machines, Fig. 2 shows a cross-section on the line 2 2 of Fig. 1, and Fig. 3 shows a detail of construction.

In using the smaller sizes of milling cutters, taps, drills, etc., it is desirable to run the tool-holder at relatively high speeds, and if such cutter, drill, etc., is to be employed in connection with machines designed for the larger sizes of similar tools, it is necessary to give the tool-holder higher rates of speed than the spindle of the machine. This has been accomplished before by various complicated arrangements of belting and annular gearing, with all of which I am enabled to dispense by means of the apparatus which constitutes the subject matter of the present invention. In this apparatus, 1 represents a gear-casing, to which the stud 2 is secured by the nut 3, and provides a bearing for the gear-wheel 5, to which the gear-wheel 4 is secured by the key 6. The gear-casing is bored to provide a bearing 8 for the outer spindle 7, to which the gear-wheel 9 which meshes with the gear-wheel 5 is secured by the key 10. The gear-wheel 11 is secured to the inner spindle 16 by means of the key 12 and meshes with the gear-wheel 4. The inner spindle 16 may be bored cylindrically throughout a portion of its extent as shown at 16' and is provided with a preferably tapered bore 16'' throughout the remainder of its extent. Boxes of bronze or other suitable bearing material 14 and 15, may be secured to the outer spindle 7, as shown, and the thrust-washers 13 and 19 may be provided to bear against the flanged ends of said boxes. A flange on the inner spindle 16 bears against the outer side of the thrust washer 13 and one of the two lock-nuts 18 18 bears against the outer side of the thrust washer 19. The gears 9, 5, 4, 11 preferably are so designed that the speed of rotation of the inner spindle is higher than that of the outer spindle, and as shown in the present instance the ratio of the speed of the inner spindle to the outer spindle is as 4 to 1. The outer spindle 7 may be provided with a flange 17' to afford a larger bearing surface on the gear-casing 1, and the oil ducts 21 may be cut into the boxes and bearings wherever desired, as shown.

It will now be obvious that when the tapered outer spindle is placed as in the spindle of a milling or drilling machine, etc., the rotation of said machine will be communicated by means of the gearing herein shown to the inner spindle 16, and that by virtue of the proportionment of said gearing, the inner spindle 16 may be rotated at any desired speed. The tool to be employed with my high speed attachment is inserted in the tapered end 16'' of the inner spindle, and for the purpose of preventing relative movement between said tool and said spindle, the pins 17, 17 may be provided for coöperating with the shank of said tool.

In order to prevent the gear-casing from rotating with the outer spindle 7, the recessed or V-shaped member 20 may be adjustably secured in the slot 20' by means of the screw 20'', by means of which it may be raised and lowered to bear against some stationary part of the machine in which the attachment is to be used, as for example, the over-hanging arm of a milling machine. By making said member 20 adjustable the apparatus is adapted for use in milling and other machines of different sizes and types.

The front side of the gear-casing 1 may be closed by the plate 1' by means of screws which pass through threaded holes in the lugs 1'', 1''.

By means of my invention a milling cutter, drill, or other tool, of such size as to require a relatively high speed of rotation, may be employed in connection with a milling or drilling machine, etc., the normal speed of which is lower than that required for said tool, by the simple expedient of inserting the outer spindle 7 in the spindle of said machine and without having recourse to belting or other means for changing the speed of said machine.

Although for the purpose of more clearly disclosing my invention, I have illustrated and described one particular embodiment of the same, I do not wish to be limited to the exact construction shown and described inasmuch as it will be obvious that many modifications may be made therein by those skilled in the art without departing from the spirit of my invention.

I claim:

In an apparatus of the character described, the combination with a gear-casing and an outer spindle adapted to be inserted in the spindle of a milling machine or the like and journaled in said gear-casing, of an inner spindle journaled in said outer spindle, a system of speed-increasing gearing associated with said spindles for communicating motion from said outer spindle to said inner spindle and a member having a recessed bearing surface adjustably secured to said gear-casing and arranged to bear against a stationary portion of said machine for preventing the rotation of said gear casing.

In testimony whereof, I have hereunto subscribed my name this 8th day of August 1906.

VICTOR C. CHACE.

Witnesses:
WANTON M. GLADDING,
CHARLES B. THOMPSON.